H. D. LEEKING.
COMBINED DISH PAN AND DRAINER.
APPLICATION FILED JUNE 28, 1909.

943,750.

Patented Dec. 21, 1909.

WITNESSES:
E. H. Kreider
M. L. Lefevre.

INVENTOR
Harry D. Leeking,
BY
John J. Thompson
ATTORNEY

UNITED STATES PATENT OFFICE.

HARRY D. LEEKING, OF LANCASTER, PENNSYLVANIA.

COMBINED DISH PAN AND DRAINER.

943,750.  Specification of Letters Patent.  Patented Dec. 21, 1909.

Application filed June 28, 1909. Serial No. 504,714.

*To all whom it may concern:*

Be it known that I, HARRY D. LEEKING, a citizen of the United States, residing at Lancaster, in the county of Lancaster and State of Pennsylvania, have invented certain new and useful Improvements in Combined Dish Pans and Drainers, of which the following is a specification, reference being had therein to the accompanying drawing.

My invention relates to a combined washer and drainer of that class which is used for washing dishes, glassware, etc., and provided with a support to keep them out of the water and upon which they may drain and dry.

The objects of the invention are to produce a device of this class which will be cheap, durable and easily kept clean, and obviate all danger of slopping the water upon the table.

Another object of the invention is to provide an article of this class comprising a pan formed with flanged sides for the purpose of retaining the dishes from sliding off while being drained; and also to provide a removable strainer formed with depressed portions which may be partially submerged in the water, thus allowing the wash-cloth to be wetted without removing the strainer and without getting the dishes in the water, and further, the strainer is provided with a transverse rail, against which the dishes may be stacked; and it may here also be noted that the depressed portions of the strainer serve as supports upon which the strainer may rest when removed from the pan.

With these and other objects in view, my invention consists in certain construction and combination of parts as will hereinafter be fully described and claimed in the annexed specification and illustrated in the accompanying drawings, which form a part of this application, and in which like figures of reference refer to corresponding parts in all of the views; but it is fully understood that while I have herewith described my invention as here illustrated, that I do not confine myself to the exact design as shown, as slight changes may be made in the construction and arrangement of the several parts without departing from the spirit of the invention.

Figure 1:
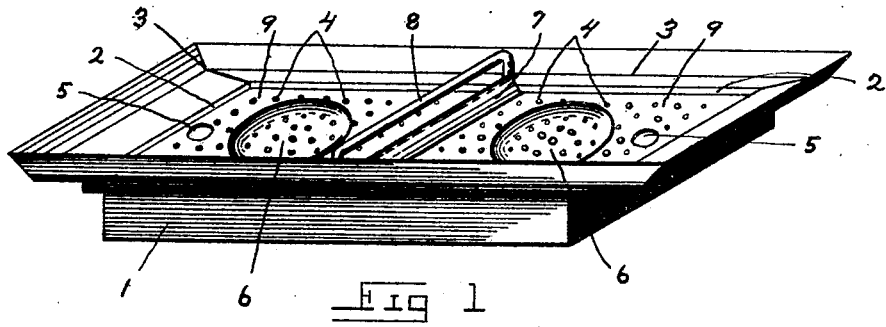
Figure 2:
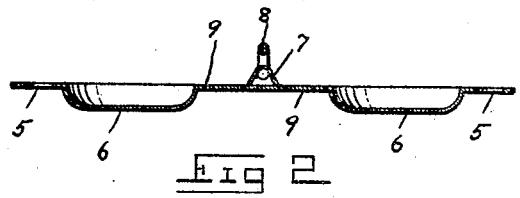
Figure 3:
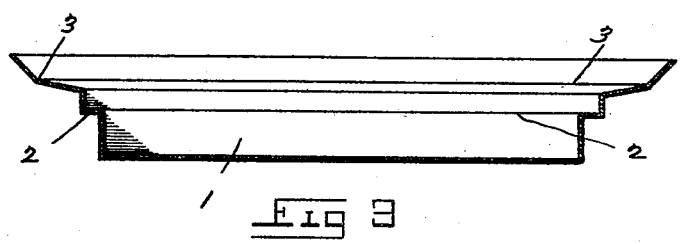

In the drawings:—Figure 1, is a perspective view of my device as assembled for use. Fig. 2, is a longitudinal sectional view of the strainer removed. Fig. 3, is a longitudinal sectional view of the pan with the strainer removed.

Referring to the drawings, 1, indicates a pan which is here shown as rectangular in form, but which may be of any shape and which has formed in its sides, at a suitable height from the bottom, the ledge 2, upon which the strainer may be supported; while above said ledge 2, the sides are flared outward and then upward to form a flange 3, against which the dishes may rest.

The strainer 9 is of a form to fit and rest upon the ledge 2, and is provided with the drain perforations 4, and the finger lifting holes 5; while its body is formed with the depressed and perforated portions 6, within which the dishes may be placed while being washed and the transverse rib 7, which is designed to strengthen the strainer and also to afford a support for the supporting rod 8.

Having thus described my invention what I claim as new and desire to secure by Letters Patent is:—

A device of the class described, comprising a pan formed with a strainer supporting ledge in the sides thereof, and a dish retaining flange formed in the sides thereof above said ledge, a removable strainer formed with perforations in the body thereof and designed to rest upon said ledge, perforated depressions formed in the body of said strainer and designed to extend below the surface of the water within said pan, and a transverse rib extending upward from the surface of said strainer for the purpose of supporting the dishes.

In testimony whereof I affix my signature in presence of two witnesses.

HARRY D. LEEKING.

Witnesses:
WM. J. COULTER,
MABEL L. LEFEVRE.